June 20, 1967 SHINICHIRO OGAWA ET AL 3,327,237

CURRENT DRIVE TYPE TRANSISTORIZED SERVO-AMPLIFIER DEVICE

Filed July 3, 1964

United States Patent Office 3,327,237

Patented June 20, 1967

3,327,237

CURRENT DRIVE TYPE TRANSISTORIZED SERVO-AMPLIFIER DEVICE

Shinichiro Ogawa, Chuo-ku, Tokyo, Ken Shiragaki, Fujisawa-shi, and Michio Yamamoto, Ohta-ku, Tokyo, Japan, assignors to Honeywell Inc., Minneapolis, Minn., a corporation of Delaware Filed July 3, 1964, Ser. No. 380,167

Claims priority, application Japan, July 8, 1963, 38/35,100

1 Claim. (Cl. 330—30)

This invention relates to a current drive type servo-amplifier which is constructed to indicate and/or record a signal current from a constant-current type oscillator which converts a physical amount to be measured into a uniform current signal (for example, direct current in an order of 4 ma. to 20 ma.) and generates the converted signal current.

It is an object of the present invention to provide a transistorized servo-amplifier which utilizes differential current directly as an input signal, between signal current from a constant current type oscillator and a predetermined current of a constant current type receiver (for example an indicator and/or a recorder or the like).

Another object of this invention is to provide a current drive type transistorized servo-amplifier which has very small power-loss characteristics and has no dark-current characteristics.

Figure 1:
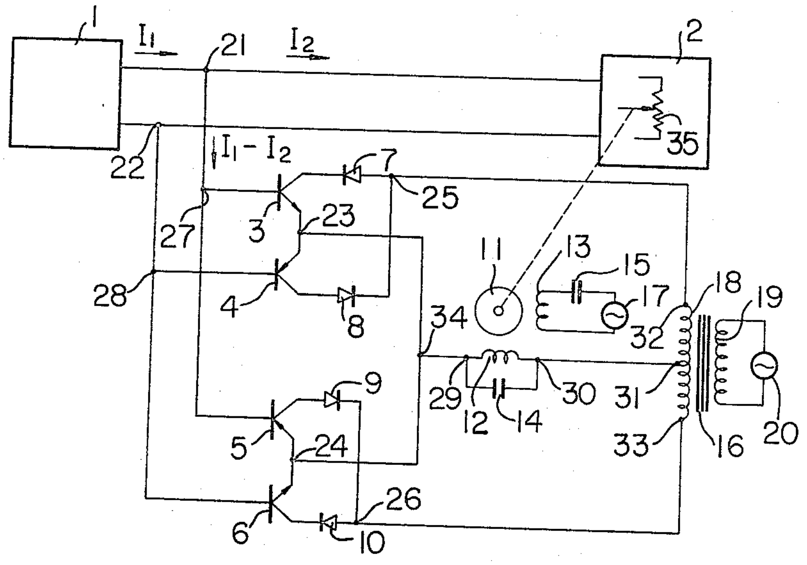
Figure 2:
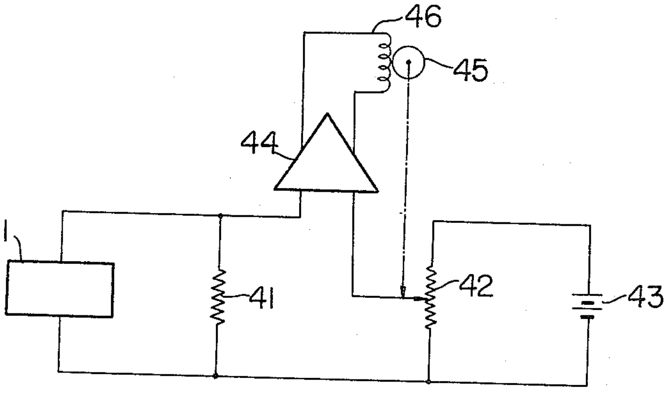

The nature of this invention will be better understood from the following description of one embodiment thereof taken in conjunction with the accompanying drawing in which:

FIG. 1 is a typical circuit of a current drive type amplifier of this invention, and FIG. 2 is a block diagram of a conventional voltage comparison type servo-amplifier.

Referring to FIG. 1, which shows an embodiment of this invention, a constant current type oscillator 1 converts a process variation into a unipolar direct current in an order of 4 ma. to 20 ma. and generates the converted unipolar direct current. 2 is a balancing constant current type apparatus as a constant current type receiver, in which a variable resistor 35 is connected to a constant current source. 3 is the first NPN type transistor and 4 is the first PNP type transistor. 5 is the second PNP type transistor and 6 is the second NPN type transistor. These transistors preferably have the same electrical characteristics except as to their polarities. Furthermore, these transistors are preferably made of silicon having less dark current *Ico* property, but, as will be clear from the subsequent explanation, germanium transistors can also be used. 7, 8, 9 and 10 are protection diodes used for the four transistors respectively, which are connected to the collector of each transistor in continuity direction. The emitters of the first NPN transistor 3 and the first PNP transistor 4 are connected directly to each other, and their collectors make a loop circuit through the protection diodes 7 and 8. The base of the first NPN transistor 3 is connected to one terminal 21 of the input (which is the output terminal of the oscillator 1), and the base of the first NPN transistor is connected to another terminal 22 of the input. A connected point 23 of the emitters is connected to a point 29 of the output, and the connected point 25 of the collectors is connected to the other point 30 of the output through the secondary winding 18 of a power source transformer 16. By composing an electric circuit as mentioned above, the first NPN transistor 3 and the first PNP transistor 4 form a polar discriminator type amplifier I.

The emitters of the second PNP transistor 6 and the second NPN transistor 5 are connected to each other, and their collectors make a loop circuit through the protection diodes 10 and 9. The base of the second NPN transistor 6 is connected to the terminal 22 and the base of the second PNP transistor 5 is connected to the terminal 21. A connected point 24 of the emitters is connected to the point 29 of the output and the connected point 26 of the collectors is connected to the other point 30 through the secondary winding 18 of the power source transformer 16. By composing an electric circuit as mentioned above, the second NPN transistor 6 and the second PNP transistor 5 form another polar discriminator type amplifier II.

11 is a two-phase servo-motor, which is connected mechanically to a slider of the variable resistor 35 in the constant current receiver 2 so as to transmit the rotation of the motor thereto. A control winding 12 of the servo-motor 11 is connected between the output terminals 29 and 30. 13 is an exciting winding of the servo-motor 11 and 17 is an alternating current source. 14 is a condenser used for improving the power-factor characteristics and 15 is a condenser used for determining phase difference. 20 is a power source used in this circuit, which has the same frequency as the current source 17, and there is preferably no phase difference between the sources 20 and 17. 19 and 18 are respectively the primary winding and the secondary winding of the power source transformer 16. 31 shows an intermediate tap of the secondary winding 18, and 32 and 33 are terminals of the secondary winding 18.

As illustrated above, the servo-amplifier in accordance with this invention comprises input terminals 21 and 22, output terminals 29 and 30, and a pair of the polar discriminator type amplifier circuits composed of NPN transistors and PNP transistors connected between the input and output terminals.

A detailed explanation on the operation of this amplifier will be shown as follows:

Referring to FIG. 1, a signal current $I_1$ is an output of the constant current type oscillator I and a current $I_2$ shows the predetermined magnitude of current of the constant current type receiver 2. Now, when the current $I_1$ is in an order of magnitude larger than that of the current $I_2$, the differential current $(I_1-I_2)$ flows in the circuit—the input terminal 21—the base and emitter of the first NPN transistor 3—the emitter and base of the first PNP transistor 4—the input terminal 22, and therefore the polar discriminator type amplifier circuit I is kept in an "on" condition and the polar discriminator type amplifier circuit II is kept in an "off" condition. In this case, an alternating current is fed between the emitter and collector of the first NPN transistor 3, the first PNP trainsstor 4, the second PNP transistor 5 and the second NPN transistor 6, respectively, and on the other hand, positive or negative voltage is supplied in each half cycle to the collectors of the first NPN transistor 3, the first PNP transistor 4, the second PNP transistor 5 and the second NPN transistor 6. When the differential current $(I_1-I_2)$, as the base current, flows in the polar discriminator type amplifier I, the collector current which is $\beta$ times the differential current $(I_1-I_2)$, as the base current, flows in the first NPN transistor 3 in one half cycle in which the positive voltage to the collector of the polar discriminator type amplifier circuit I is imposed. This collector current $\beta\times(I_1-I_2)$ is fed from the emitter to the collector of the first NPN transistor 3 through the control winding 12 of the servo-motor 11 and the secondary winding 18 of the power source transformer 16.

In the subsequent one half cycle, negative voltage is supplied to the collector of the polar discriminator type amplifier circuit I, so the collector current which is $\beta$ times the differential current ($I_1-I_2$) as the base current is fed to the first PNP transistor 4. This collector current $$\beta\times(I_1-I_2)$$

is fed from the emitter to the collector of the first PNP transistor 4 through the secondary winding 18 of the power source transformer 16 and the control winding 12 of the servo-motor 11. Being understood from the description of the operation in each one half cycle, the current direction in the control winding 12 of the servo-motor 11 alternates reversely by turns in each one half cycle, therefore the servo-motor rotates so as to shift the slider of the variable resistor 35 in the constant current type receiver 2, to balance the magnitude of the current $I_1$ and $I_2$ and to record the signal current from the constant current type oscillator.

If the signal current $I_1$ from the constant current type oscillator 1 is smaller than the predetermined current $I_2$ of the constant current type receiver 2, the differential current ($I_2-I_1$) flows from the input terminal 22 to the input terminal 21 through the base-emitter of the second NPN transistor 6 and the emitter-base of the second PNP transistor 5, and therefore the differential current keeps the polar discriminator typel amplifier circuit II in an "on" condition and the polar discriminator type amplifier circuit I in an "Off" condition. Accordingly, the second NPN transistor 6 and the second PNP transistor 5 will operate by turns corresponding to the positive and negative polarities of the collector voltage, and permit the current $\beta$ times the differential current ($I_2-I_1$) to flow in the control winding 12 of the servo-motor 11. In this occasion, the servo-motor 11 will rotate in reverse in respect to the movement in case of the current $I_1$ being larger in magnitude than the current $I_2$. It is to be noted that the servo-amplifier provided by this invention discriminates the polarity of the input current and amplifies the input current to be fed in the control winding of the servo-motor.

Dark current $I_{co}$ which is harmful to a transistor circuit will be explained in accordance with the scope of this invention. Referring to dark currents of the first NPN transistor 3 and the second PNP transistor 5, the former flows in the control winding 12 from output terminal 29 to 30 and the latter flows in the same winding from the terminal 30 to 29. Having the same order of magnitude, both dark currents act substantially to cancel each other. On the other hand, it can be also understood that dark currents of the first PNP transistor 4 and the second NPN transistor 6 will cancel each other, and, therefore, that this invention provides an excellent servo-amplifier which is not affected by dark current.

FIG. 1 illustrates one of the embodiments of this invention, but other embodiments can be constructed as follows. In a variation of this circuit of FIG. 1, the connected points 25 and 26 of the collectors are connected to the output terminal 29, and the connected points 23 and 24 of the emitters are connected to the terminals 32 and 33 of the secondary winding 18, respectively. In this embodiment, protection diodes 7, 8, 9 and 10 are connected to the emitter of each transistor in the continuity direction. It is moreover easily understood in this embodiment that these protection diodes could be connected to the base of each transistor in their continuity direction.

FIG. 2 illustrates a diagram of a conventional servo-amplifier device, which comprises the constant current type oscillator 1, an input resistor 41, a variable resistor 42, a constant voltage source 43, a servo-amplifier 44, a servo-motor 45, and a control winding 46 therefor.

Referring to FIG. 2, when a signal current flows into the input resistor 41, the signal current is converted to a voltage signal in proportion to the input resistor 41. This voltage signal is compared, in an order of magnitude, with a predetermined voltage of the variable resistor 42 and the differential voltage is fed to the servo-amplifier. The amplified output voltage from the servo-amplifier is supplied to the control winding 46 of the servo-motor 45 so as to balance the input signal and the predetermined voltage signal and to indicate and record the input-signal magnitude simultaneously, by shifting a slider of the variable resistor 42. In such a voltage comparison type servo-amplifier device, it is necessary to provide a network having a high input impedance and considerable high amplification degree in order to detect a miniature voltage. So the conventional amplifier device is apt to be very complicated and expensive. Moreover, when an input signal is a current signal, it is necessary to provide a fixed resistor which converts the current signal into a voltage signal in proportion to the current. Therefore, the use of the fixed resistor substantially produces power loss therein.

On the other hand, the transistorized current drive type servo-motor amplifier device in accordance with the present invention is a very useful and simple device which provides little power loss in the net works, reliable operation, and no dark-current characteristics.

The invention is not limited in any way to the form of construction described above and illustrated, and modification can be made thereto without departing thereby from the scope of said invention.

What is claimed is:

A current drive type servo amplifier comprising first, second, third, and fourth transistors, each having a collector electrode, an emitter electrode, and a base electrode, said first and fourth transistors being of the same conductivity type, and said second and third transistors being of the same conductivity type which is opposite to the first mentioned conductivity type, a first input terminal connected to the bases of said first and third transistors, a second input terminal connected to the bases of said second and fourth transistors, a first output terminal connected to the emitters of all of said transistors, a winding supplied with alternating current and having a first end terminal, a second end terminal, and a center tap, a connection between said first end terminal and the collectors of said first and second transistors, a connection between said second end terminal and the collectors of said third and fourth transistors, unidirectionally conductive means connected in the collector-emitter circuits of said transistors to permit only the normal direction of collector current flow, a second output terminal connected to said center tap, and an output device connected between said output terminals, whereby direct current flow in one direction between said input terminals causes said first and second transistors to be made alternately conductive to cause an alternating current flow through said output device of a predetermined phase, whereas direct current flow in the opposite direction between said input terminals causes said third and fourth transistors to be made alternately conductive to cause an alternating current flow through said output device of a phase opposite to said predetermined phase.

References Cited

UNITED STATES PATENTS

| | | | |
|---|---|---|---|
| 2,819,352 | 1/1958 | Houck | 330—13 X |
| 2,884,545 | 4/1959 | Hovek. | |
| 2,936,345 | 5/1960 | Kinkel | 330—116 X |
| 3,231,827 | 1/1966 | Legler | 330—30 X |

FOREIGN PATENTS

| | | |
|---|---|---|
| 1,083,331 | 6/1960 | Germany. |

ROY LAKE, *Primary Examiner.*

F. D. PARIS, N. KAUFMAN, *Assistant Examiners.*